United States Patent
Carswell

(10) Patent No.: US 11,198,510 B2
(45) Date of Patent: Dec. 14, 2021

(54) SYSTEM AND METHOD FOR MANAGING AIRCRAFT BIN SPACE

(71) Applicant: Systems and Software Enterprises, LLC, Brea, CA (US)

(72) Inventor: Samuel Allen Carswell, Brea, CA (US)

(73) Assignee: Safran Passenger Innovations, LLC, Brea, CA (US)

( * ) Notice: Subject to any disclaimer, the term of this patent is extended or adjusted under 35 U.S.C. 154(b) by 426 days.

(21) Appl. No.: 16/235,915

(22) Filed: Dec. 28, 2018

(65) Prior Publication Data
US 2019/0233113 A1    Aug. 1, 2019

Related U.S. Application Data

(60) Provisional application No. 62/623,765, filed on Jan. 30, 2018.

(51) Int. Cl.
| | |
|---|---|
| H04N 7/18 | (2006.01) |
| B64D 11/00 | (2006.01) |
| B64D 47/08 | (2006.01) |
| B64D 45/00 | (2006.01) |
| G06T 7/62 | (2017.01) |
| G06Q 10/02 | (2012.01) |

(52) U.S. Cl.
CPC ............ B64D 11/003 (2013.01); B64D 45/00 (2013.01); B64D 47/08 (2013.01); G06T 7/62 (2017.01); H04N 7/181 (2013.01); H04N 7/183 (2013.01); H04N 7/188 (2013.01); *G06Q 10/02* (2013.01); *G06T 2207/30268* (2013.01)

(58) Field of Classification Search
CPC ...... B64D 11/003; B64D 47/08; B64D 45/00; H04N 7/181; H04N 7/188; H04N 7/183; G06T 7/62; G06T 2207/30268; G06Q 10/02

USPC ......................................................... 288/118.1
See application file for complete search history.

(56) References Cited

U.S. PATENT DOCUMENTS

| | | | |
|---|---|---|---|
| 7,937,169 B2 | 5/2011 | Kneller et al. | |
| 9,764,842 B2 | 9/2017 | Woicekowski | |
| 10,681,979 B1* | 6/2020 | Shingne | .................. A47F 7/26 |
| 2002/0152470 A1* | 10/2002 | Hammond | ............. H04N 7/106 |
| | | | 725/76 |
| 2012/0090395 A1 | 4/2012 | Lavoie | |

(Continued)

FOREIGN PATENT DOCUMENTS

EP    3098163 B1    9/2017

OTHER PUBLICATIONS

Korean Intellectual Property Office, International Search Report and Written Opinion, dated Apr. 23, 2019.

*Primary Examiner* — Shan E Elahi
(74) *Attorney, Agent, or Firm* — Umberg Zipser LLP; Ryan Dean

(57) ABSTRACT

Systems and methods are described for managing overhead bin space in an aircraft or other vehicle. An available space or the used space with an overhead bin can be measured using a set of sensors. Using information from the set of sensors, a dongle can determine a shape and volume of the used or unused space within the overhead bin. With this information, the available space can then be reported including the number of roller bags that would fit in the overhead bin or whether there are objects that are not roller bags within the overhead bin.

20 Claims, 5 Drawing Sheets

(56) References Cited

U.S. PATENT DOCUMENTS

| | | | |
|---|---|---|---|
| 2014/0075506 A1* | 3/2014 | Davis | H04L 63/0209 726/3 |
| 2015/0241209 A1* | 8/2015 | Jouper | G01B 17/00 702/156 |
| 2016/0306384 A1* | 10/2016 | Carvey | G06F 1/1607 |
| 2016/0332729 A1 | 11/2016 | Woicekowski | |
| 2017/0230620 A1* | 8/2017 | Watanabe | B64D 11/003 |
| 2017/0283086 A1 | 10/2017 | Garing et al. | |
| 2018/0008890 A1* | 1/2018 | Condon | A63F 13/245 |
| 2018/0173962 A1* | 6/2018 | Ibrahim | B64D 11/003 |

* cited by examiner

SYSTEM AND METHOD FOR MANAGING AIRCRAFT BIN SPACE

This application claims priority to U.S. provisional patent application having Ser. No. 62/623,765 filed on Jan. 30, 2018. This and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is detection and management of overhead bin space in aircraft or other vehicles.

BACKGROUND

The background description includes information that may be useful in understanding the present invention. It is not an admission that any of the information provided herein is prior art or relevant to the presently claimed invention, or that any publication specifically or implicitly referenced is prior art.

Passengers often prefer to store their bags in cabin overhead bins rather than having them checked. Overhead bin space is typically filled on a first come, first serve basis, which leads to stress placed on passengers and the crew to try and find space to store bags. In addition, overhead bin space in a vehicle is limited, often requiring later arriving passengers to check bags.

There are some proposed solutions to reduce the search for unused overhead bin space. For example, U.S. Pat. No. 9,764,842 discusses the use of visual indicators such as light or text to indicate whether an overhead bin compartment is available or full. U.S. Patent Publication no. 2017/0283086 to Garing et al. (publ. Oct. 5, 2017) discusses the use of a force sensitive support device to detect whether an object is stored within an overhead bin compartment, and reporting that finding to a portable device. However, such systems suffer from one or more disadvantages as they fail to readily disclose the types of items stored in the space and the precise amount of space available.

Thus, there is still a need for systems and methods for overhead bin space management.

SUMMARY OF THE INVENTION

The inventive subject matter describes systems and methods for the management of overhead bin space through the detection of the available space and related reporting of that information to flight crew and/or passengers. Specifically, the subject matter discussed herein is directed to the electronic detection and reporting of an overhead bin or compartment's status as empty, full or partially full, and the remaining useful bag space, if any.

Although the discussion herein focuses on an aircraft, it is contemplated that the systems and methods discussed herein could likewise be used on ships, trains, busses, and other vehicles.

By helping crew and passengers understand where and how much space is available, stress can be reduced. In addition, the systems and methods described herein allow for reservation of bin space in advance of boarding, which could be free or fee-based.

Various objects, features, aspects and advantages of the inventive subject matter will become more apparent from the following detailed description of preferred embodiments, along with the accompanying drawing figures in which like numerals represent like components.

DETAILED DESCRIPTION

Throughout the following discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Figure 1:
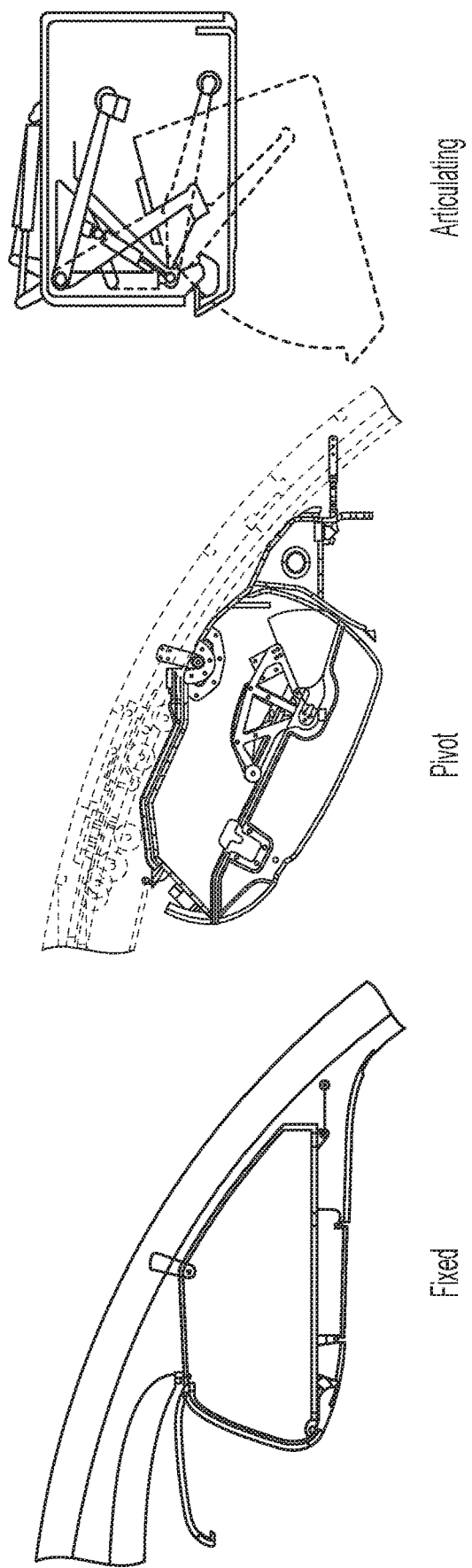
FIG. 1 illustrates overhead bins of the prior art.

FIG. 1 depicts vertical cross-section views of three overhead bin types: fixed, pivot and articulating. However, the inventions disclosed herein are not limited to these three types, and advantageously could work with many types of overhead bins. In addition, the inventions described herein can be used in conjunction with existing aircraft or other vehicles and do not require implementation during construction of the aircraft or other vehicle.

Figure 2:
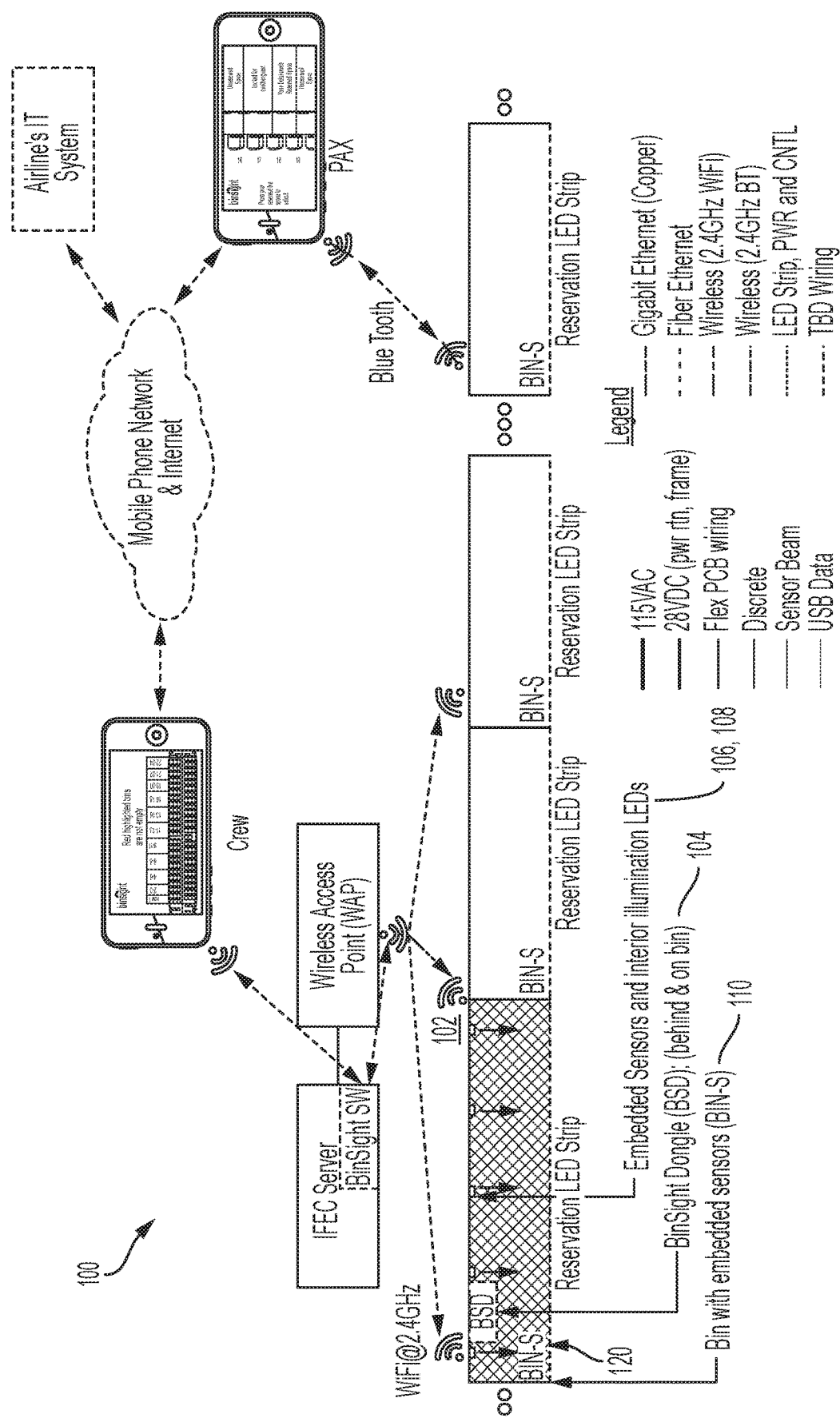
FIG. 2 illustrates a diagram indicating information flow in one embodiment of a system for overhead bin management.

An overview of one embodiment of a system 100 for overhead bin management is shown in FIG. 2. The left most bin door 102 is open revealing a dongle 104, sensors 106 and illumination LEDs 108 embedded at the top of the bin 110. Reservation LED strips 120 depicted at the bottom of each bin 110 is controlled by the dongle 104, which could control the color and luminance of each LED in the strip 120 and optionally display alpha-numeric data.

The dongle 104 is configured to control operation of the sensors 106 and receive signals or other data. It is contemplated that the sensors 106 can include, for example, one or more cameras and/or one or more light sources operating within the camera's optical spectrum. The one or more light sources may be LEDs or lasers producing unstructured or structured light, and can be separate from illumination LEDs 108.

In addition or alternatively, sensors 106 could include, for example, one or more distance measurement devices. Preferred distance measurement devices utilize Laser Time of Flight (ToF) distance measurement, although infrared (IR) triangulation, ultra-sonic detectors and other measuring devices could also be used though with less accuracy.

Utilizing the sensors 106, a status of the bin can be detected, which could include (i) a filled state; (ii) a partially-filled state; and (iii) an empty state.

Empty State

Detection of an empty bin advantageously ensures hazardous or forgotten objects are not in overhead bins before passenger boarding or after passenger deboarding. Using the sensors 106, which can include a camera, multiple images of the overhead bin's 110 interior can be captured using multiple illuminators and/or cameras. The shape and volume of the overhead bin 110 is computed using known machine vision algorithms. For example, gradients in luminance magnitude of each captured image can be processed by dongle 104 or other component of system 100 to detect edges, corners, ridges and points of interest within the bin 110. The points of interest from the captured images can then be processed to reject surface markings, which do not vary with angle, and can detect three dimensional objects, whose shadows or structured light location varies with the angle of view, object location and object shape. After processing, the location and dimensions for detected surfaces can be compared with saved objects of empty bins previously computed when the bin 110 was known to be empty. Height, width, depth and/or volume differences are computed. Based on these computations, "empty" or "not empty" states can be reported for each bin based on comparing the differences with specified thresholds.

Laser Time of Flight (ToF) distance measurement devices can enhance the accuracy of object detection within overhead bin 110. For example, ToF distance measurement devices can detect if a false bottom was inserted in the overhead bin 110, such as to hide an object, and which might not otherwise be detected by sensors 106 using unstructured light. Each ToF distance measurement device can be used to accurately measure a distance on a single fixed axis in the overhead bin 110. The measured distance is then compared with the saved data points previously measured when the overhead bin was known to be empty. A "not empty" state is reported when one or more of these distances varies from a predetermined value or range of values.

The dimensions and view orientation of overhead bin 110 may change when the overhead bin 110 is open and closed. For example, if the overhead bin 110 comprises an open clam shell such as that shown in FIG. 1, a distance from the bin ceiling to floor may more than double when opened as compared with when the overhead bin 110 is closed. Therefore, during empty bin detection to define the predetermined thresholds, two sets of data sets can be collected: open overhead bin and closed overhead bin. These two sets of data are used to determine if the overhead bin 110 is open or closed. The selected data set is then used to precisely determine the current state of overhead bin 110.

Figure 3:
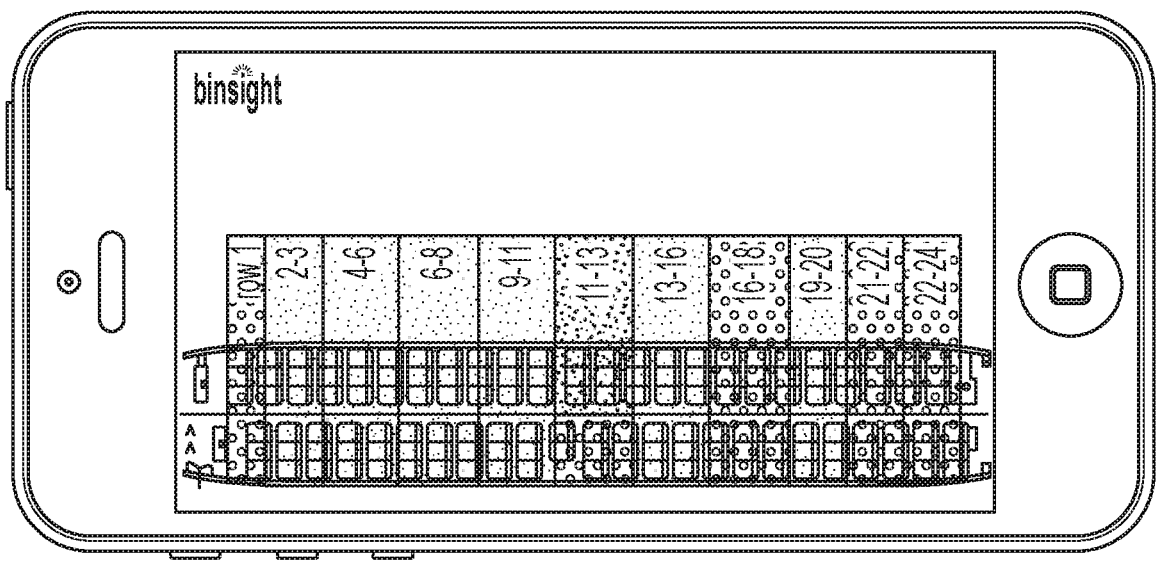
FIGS. 3-5 illustrate exemplary user interfaces that indicate statuses of overhead bins.

FIG. 3 depicts an exemplary user interface showing a plan view of an aircraft cabin and overhead bins over the seats as can be displayed on a portable device or PED. The crew can readily identify the pink bin over rows 11-13 as not empty.

Partially-Filled State

Rather than just state that there is an object in an overhead bin 110, a partial fullness calculation is much more useful if it is accurate enough to provide passengers and crew insight into each overhead bin's capacity to store more luggage, especially given the relative inflexibility of roller bags. The sensors 106, which can include cameras, illuminators, laser ToF distance measurement devices such as discussed above, as well as the algorithms described above, can be used for "partially-filled" state computations.

The location, dimensions, and distance measurements are compared to the predetermined "empty bin" data set to determine if the bin is open or closed. Next, the shape and volume of the remaining space of the overhead bin 110 is computed by using the difference between the current and empty data. From that, a percentage of available space can be reported. A second algorithm can be used to determine and report a maximum number of "roller bin" cube shapes that can fit into the available space. This is typically based on an average or typical size of a roller bin.

Figure 4:
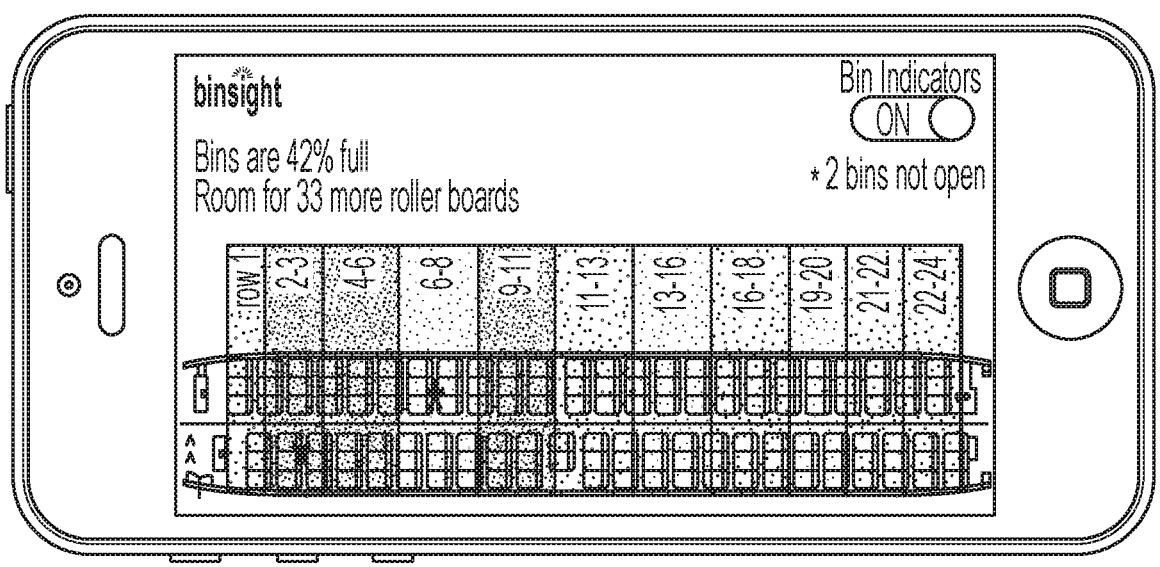
Figure 5:
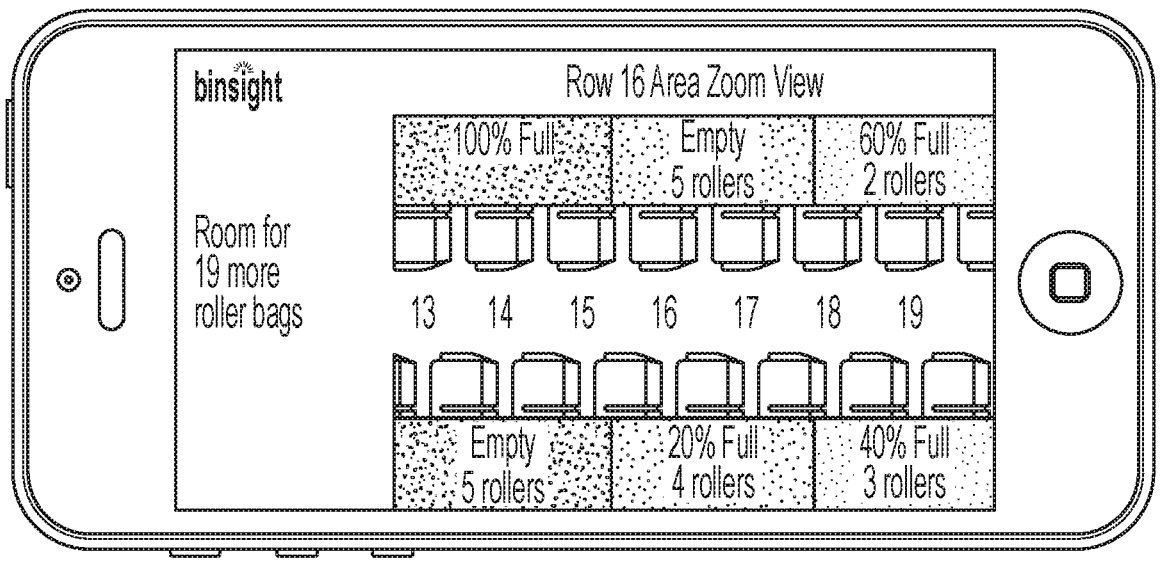

Such information can then be reported to crew and/or passengers. For example, FIGS. 4-5 depict a plan view of an aircraft cabin and overhead bins over the seats. Using a graphical user interface, a crew of the aircraft can readily identify the overall overhead bin fullness as a volume percentage and available space for more roller board bags.

Full State

Preferably, an overhead bin is determined to be in the "full" state when the remaining volume is zero, near zero or the remaining shape (volume) is so fragmented that no useful space remains for passenger's belongings. Where "filled percentages" are also reported with the number of roller bags that could still be stored within each bin, this can be useful to help crew identify overhead bins that may have additional space if objects stored within are rearranged, or certain items such as jackets/coats and/or small bags are removed. It is further contemplated that the system could identify to the crew via the user interface those bins that may allow for additional roller bags if certain items were removed or rearranged. This determination could be based on the relative distance measured by each sensor and/or pictures taken within the bin to determine whether objects present are roller bags or smaller items.

It is contemplated that the dongle 104 can communicate via a wired or wireless with one or more of an In-flight Entertainment Connectivity (IFEC) server, crew Personal Electronic Devices (PEDs) and Passenger PEDs using IEEE 802.11 (e.g., a smartphone) and Bluetooth, for example. However, embodiments using wired connections and/or processing outside of the PEDs are equally applicable to the inventive subject matter described herein.

The system 100 can be further configured to address situations where one or more of the sensors 106 are blocked—e.g., when overhead bin contents block a signal to/from a camera, an illuminator or a distance measurement device. In such situations, the algorithm is written to assume a distance is zero (rather than infinite). If all sensors are blocked, the overhead bin can be reported in the "full" state.

To reduce power requirements of the overhead bin sensor system when not in use, the system can be configured such that sensors 106 such as cameras only capture images when one or more low-power distance measurement devices detect a change in distance of the axis being measured. If such a change in distance is detected, the cameras and illuminators can then be activated to capture images, for example. This advantageously also reduces data transfer and processing of the captured images when not needed, and thereby reduces the overall power requirements of the system 100.

Using the system 100, it is contemplated that an open or closed state of each overhead bin can also be monitored and reported. This allows the crew to understand what overhead bins are opened, and alert the crew if an overhead bin opens unexpectedly, such as during turbulence.

FIG. 2 depicts a combination of WiFi and Bluetooth communications used in system 100. WiFi is preferred for cabin-wide LAN distribution of data and status to the Cabin Crew and IFEC server. Bluetooth PAN is preferred for passenger-to-bin communication and technician-to-bin configuration since it uses less RF bandwidth and is more responsive and reliable. However, any commercially suitable communication protocols could be used without departing from the scope of invention.

It is further contemplated that the data from each overhead bin can be aggregated within the system 100 and reported to crew, passengers, airline IT and any other interested party. Referencing FIG. 2, image processing, data aggregation and data routing can be accomplished at the dongle 104, wireless access point, IFEC server, crew PED, passenger PED, within the airline's IT or in the cloud. Combining the disclosed invention with provisional application having Ser. No. 62/542,183, entitled "Systems And Methods For Enhanced Wireless Communication On Aircraft", the location of the processing may dynamically re-locate over time to adapt to the aircraft's flight-phase and configuration.

Figure 6:
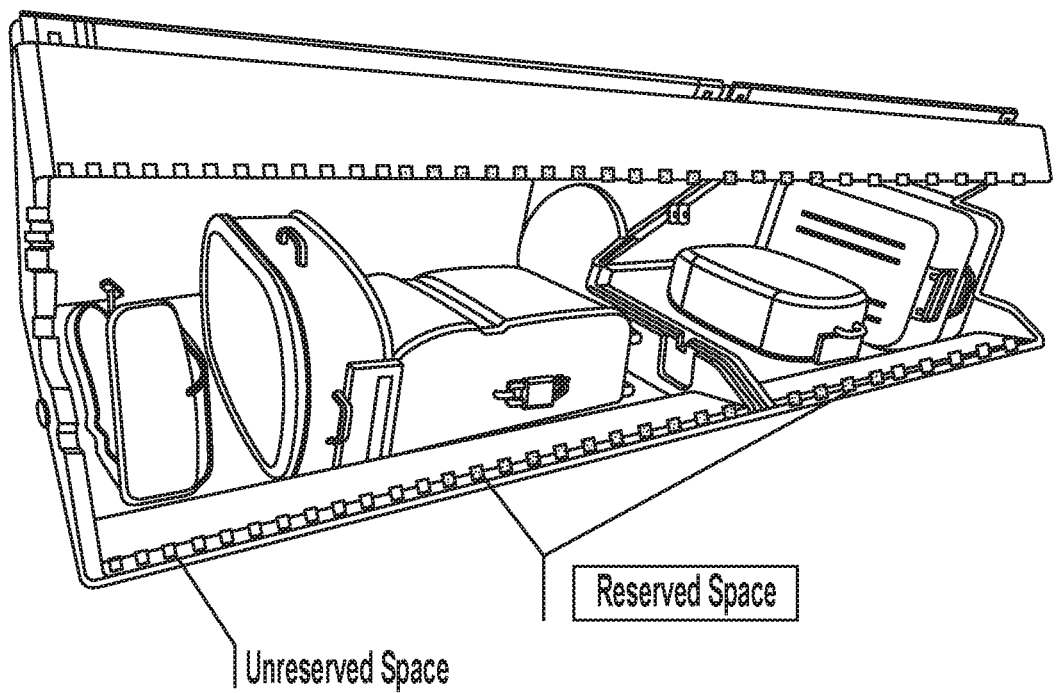
FIG. 6 illustrates one embodiment of an overhead bin having indicator lights.

In some embodiments, such as that shown in FIG. 6, system 100 can include bin reservation and management applications. This enables airlines to allow passengers to select, reserve and find bin space through an extension of the airline's existing passenger seat reservation systems.

For example, following customary practice, passengers may choose and reserve their seat location before boarding. Using system 100, passengers may also be allowed to also reserve a linear overhead bin space section that is near their reserved seat, for example. When boarding the aircraft, all passengers can place their bags in unreserved overhead bin space, which is marked with green LEDs in this example. Reserved bin space may be marked with a different color—here, using red LEDs and optional display of the reserving passenger's seat number or other identifier.

Figure 7:
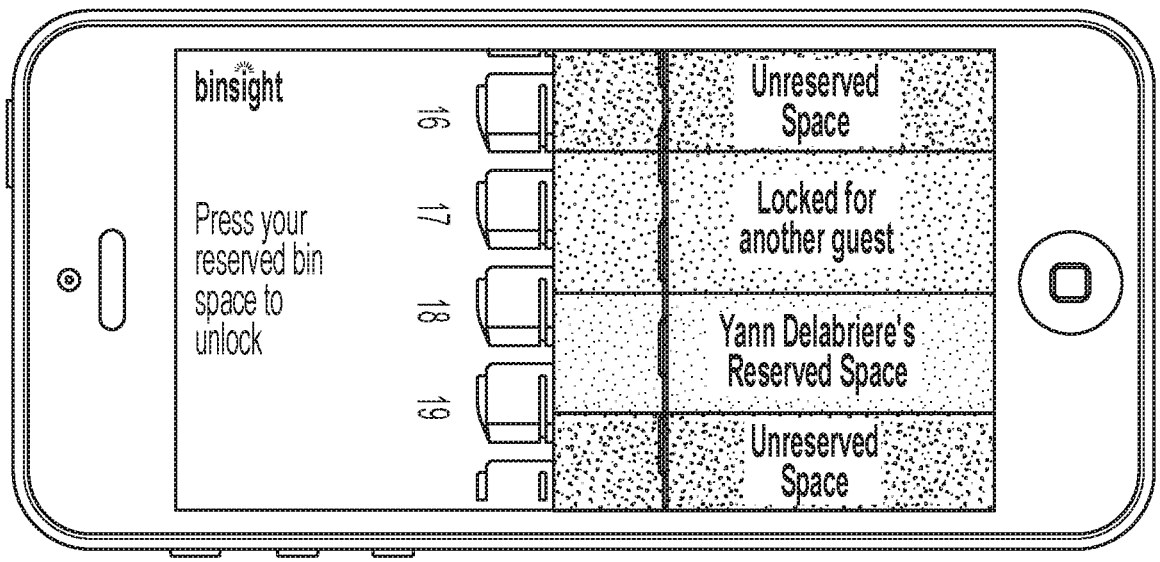
FIG. 7 illustrates another embodiment of a user interface indicating statues of overhead bins.
Figure 8:
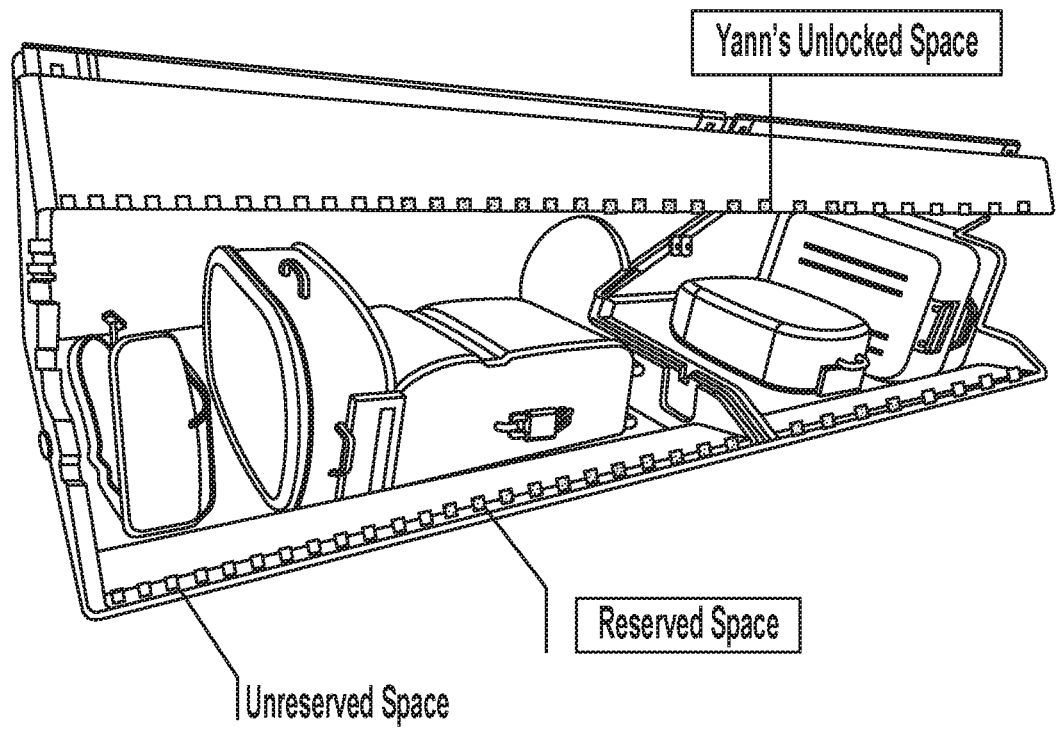
FIG. 8 illustrates another embodiment of an overhead bin having indicator lights.

The passenger with reserved bag space, Yann in this example, locates his overhead bin space using his PED. See FIG. 7. Using the PED's touch screen, Yann signals he is ready to fill his overhead bin space and the bin's LEDs may give a visual response, turning blue in FIG. 8. Once finished loading his space the Yann signals to mark space reserved and the LEDs are once again red.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method for managing overhead bin space in a vehicle, comprising:
providing a set of sensors configured to record data about one or more storage spaces within the vehicle;

providing a dongle communicatively coupled with the set of sensors;
capturing initial information using the set of sensors when the one or more storage spaces are empty to generate initial data points about the one or more storage spaces;
capturing secondary information about the one or more storage spaces using the set of sensors to generate a second set of data points about the one or more storage spaces;
receiving the initial information and the secondary information at the dongle, and analyzing the initial and secondary information to determine a shape and volume of the used or unused space within the one or more storage spaces by calculating a difference between the second set of data points and the saved initial data points; and
reporting a status of the one or more storage spaces, wherein the status comprises at least one of an empty state, a partially filled state, and a full state.

2. The method of claim 1, wherein the status further comprises an estimated number of roller bags that can be stored in the unused space within one or more storage spaces.

3. The method of claim 1, wherein the status further comprises an indication whether there are objects that are not roller bags within the one or more storage spaces.

4. The method of claim 1, wherein the set of sensors comprises a camera and a distance measurement device.

5. The method of claim 1, further comprising providing a set of indicator lights positioned at or near the one or more storage spaces; and wherein the dongle is configured to illuminate one or more of the set of indicator lights based on the status.

6. The method of claim 1, further comprising:
providing a set of indicator lights positioned at or near the one or more storage spaces; and
wherein the dongle is configured to change a color of light illuminated by one or more of the set of indicator lights based on the status.

7. The method of claim 4, further comprising analyzing a distance between the distance measurement device and a floor of the one or more storage spaces to generate an initial distance.

8. The method of claim 7, further comprising:
if the status comprises the empty state, analyze a distance between the distance measurement device and the floor of the one or more storage spaces to generate a first distance; and
if the first distance is less than the initial distance, transmit an alert to the dongle.

9. The method of claim 4, further comprising:
powering off the camera after an image of the one or more storage spaces is captured;
capturing a second image using the camera when the distance measurement device detects a change in distance between the distance measurement device and the floor of the one or more storage spaces; and
powering off the camera after the second image is captured.

10. The method of claim 1, wherein the one or more storage spaces comprise one or more overhead bins within the vehicle.

11. A system for managing overhead bin space in a vehicle, comprising:
a set of sensors configured to record data and transmit information about an overhead bin, wherein the set of sensors comprises at least a camera and a distance measurement device; and
a dongle configured to receive the information;
wherein the dongle is further configured to compare the received information with saved data points previously measured when the overhead bin space was known to be empty and determine a shape and volume of the remaining overhead bin space by calculating a difference between the received information and the saved data points; and
wherein the dongle is further configured to report a status of the overhead bin based on the shape and volume of the remaining overhead bin space, wherein the status comprises at least one of an empty state, a partially filled state, and a full state.

12. The system of claim 11, wherein the dongle is further configured to determine whether an object is present in the overhead bin space.

13. The system of claim 11, wherein the dongle is further configured to change a color of light illuminated by a light source disposed at or near the overhead bin, or power on or off a light source disposed at or near the overhead bin, to visually alert a state of the overhead bin space.

14. The system of claim 11, wherein the dongle is further configured to change a color of light illuminated by a light source disposed at or near the overhead bin, to visually indicate that an overhead bin space is in the full state.

15. The system of claim 11, wherein the partially filled state includes an estimated number of roller bags that can be stored within the available overhead bin space.

16. The system of claim 15, further comprising a server configured to receive the status of the overhead bin, and present overhead bin information based on the status on a portable computing device, wherein the overhead bin information comprises an overhead bin identification number, the status and the estimated number of roller bags.

17. The system of claim 11, wherein the status further comprises an indication whether there are objects that are not roller bags within the one or more storage spaces.

18. The system of claim 11, wherein the distance measurement device is further configured to analyze a distance between the distance measurement device and a floor of the overhead bin to generate an initial distance.

19. The system of claim 18, wherein the distance measurement device is further configured to analyze a second distance between the distance measurement device and the floor of the overhead bin when the status comprises the empty state, compare the second distance with the initial distance, and transmit an alert to the dongle if the second distance is less than the initial distance.

20. The system of claim 11, wherein the camera is configured to capture an image when the distance measurement device detects a change in distance between the distance measurement device and the floor of the overhead bin.

* * * * *